United States Patent
Kalkunte et al.

[11] Patent Number: 6,031,821
[45] Date of Patent: Feb. 29, 2000

[54] APPARATUS AND METHOD FOR GENERATING A PAUSE FRAME IN A BUFFERED DISTRIBUTOR BASED ON LENGTHS OF DATA PACKETS DISTRIBUTED ACCORDING TO A ROUND ROBIN REPEATER ARBITRATION

[75] Inventors: Mohan V. Kalkunte, Sunnyvale; Ganatios Y. Hanna, Fremont; Jayant Kadambi, Milpitas, all of Calif.

[73] Assignee: Advanced Micro Devices, Inc., Sunnyvale, Calif.

[21] Appl. No.: 08/914,234

[22] Filed: Aug. 19, 1997

[51] Int. Cl.$^7$ ............................ G01R 31/08; H04L 12/56
[52] U.S. Cl. .................................. 370/235; 370/412
[58] Field of Search ...................... 370/412, 413, 370/414, 415, 416, 417, 418, 428, 429, 229, 230, 231, 235

[56] References Cited

U.S. PATENT DOCUMENTS

| | | | |
|---|---|---|---|
| 4,787,082 | 11/1988 | Delaney et al. | 370/235 |
| 5,119,372 | 6/1992 | Verbeek | 370/230 |
| 5,475,679 | 12/1995 | Manter | 370/412 |
| 5,734,825 | 3/1998 | Lauck et al. | 395/200.13 |
| 5,745,491 | 4/1998 | Ando et al. | 370/428 |
| 5,787,072 | 7/1998 | Shimojo et al. | 370/231 |
| 5,812,775 | 9/1998 | Van Seters et al. | 395/200.43 |

OTHER PUBLICATIONS

B. Daines, "Gigabit Buffered Distributor Proposal," IEEE802.3z Task Force Meeting, Vancouver, Nov. 1996.

*Primary Examiner*—Hassan Kizou
*Assistant Examiner*—Daniel Prévil

[57] ABSTRACT

A buffered distributor (i.e., a full-duplex repeater) having receive buffers for respective network ports calculates pause frames based on the size of stored data packets that need to be output by the repeater core according to a round robin sequence before congestion in an identified receive buffer is eliminated. The distribution core within the buffered distributor includes a linked list register that stores the determined links of received data packets for each network port. Upon detecting a congestion condition in one of the receive buffers for a corresponding port, the buffered distributor determines the relative position of the congested port within the round robin sequence, and calculates the pause interval based on the length of the data packets that need to be output before congestion is eliminated. The sum of the data packet lengths are compared to an output data rate of the distribution core, as well as switching delays within the core. The calculated pause frames, in conjunction with the prescribed congestion threshold, ensures that buffer sizes can be efficiently designed at a low cost, without compromising cost or risk of lost data packets.

22 Claims, 3 Drawing Sheets

Figure 3A

| PORT 1 | PORT 2 | PORT 3 | PORT 4 |
|--------|--------|--------|--------|
| $L1_1$ | $L2_1$ | $L3_1$ | $L4_1$ |
| $L1_2$ | $L2_2$ | $L3_2$ | $L4_2$ |
| $L1_3$ | $L2_3$ |        | $L4_3$ |

| PORT 1 | PORT 2 | PORT 3 | PORT 4 |
|--------|--------|--------|--------|
| $L1_1 \rightarrow$ | $L2_1 \rightarrow$ | $L3_1$ | $L4_1$ |
|        |        | $L3_2$ |        |
|        |        | $L3_3$ |        |

$$\sum_{i}^{N} L_i$$

34

APPARATUS AND METHOD FOR GENERATING A PAUSE FRAME IN A BUFFERED DISTRIBUTOR BASED ON LENGTHS OF DATA PACKETS DISTRIBUTED ACCORDING TO A ROUND ROBIN REPEATER ARBITRATION

BACKGROUND OF THE INVENTION

1. Technical Field

The present invention relates to IEEE 802.3 networks having a buffered distributor as a full-duplex repeater, more specifically to arrangements for outputting flow control frames from the buffered distributor to corresponding network nodes.

2. Background Art

Efforts are currently underway to define standards for the operation of shared and full-duplex gigabit networks according to IEEE 802.3 protocol. Two modifications are currently in progress by the IEEE 802.3z task force to make Gigabit Ethernet viable, namely (1) carrier extension in which the slot time is increased to 512 bytes (4096 bits) without increasing the minimum frame length, and (2) frame bursting in which a station sends several frames separated by the extend carrier signals in a single burst. A network node (i.e., a network station) performs frame bursting by attempting to send a first packet according to the conventional Carrier Sense Multiple Access with Collision Detection (CSMA/CD) protocol. The network node starts a burst timer at the beginning of the transmission of the first packet. If the first packet transmission is successful and if the network node has a second data packet (i.e., frame) to send, the network node transmits a second data packet if the burst timer has not expired. The network station also maintains the carrier sense in an asserted state (e.g., holds carrier sense high) during the entire burst. Hence, the network station can transmit a burst of data packets until the burst timer expires or until the network station has no additional data packets to transmit. If a collision occurs during transmission of the first frame, the station follows the conventional CSMA/CD protocol, namely jam, abort, and collision mediation using the truncated binary expediential backoff (TBEB) algorithm.

Certain vendors have proposed a buffered distributor, also referred to as a full-duplex repeater, as a viable alternative to a full-duplex switch. Specifically, the buffered distributor includes a number of network ports, where each network port is configured for full-duplex communication with a corresponding network node. Each network port includes a receive first in-first out (FIFO) buffer, and a transmit FIFO buffer. The buffered distributor also includes a repeater core, also referred to as a "backplane", that distributes a data packet stored in one of the receive FIFO buffers to the other network ports. Specifically, a receive FIFO buffer outputs a stored data packet to the other network ports by gaining access to the backplane. Access to the backplane maybe implemented either by CSMA/CD logic, where the Receive FIFO buffers contend for access to the backplane using a zero topology collision domain (using CSMA/CD logic), or another arbitration scheme such as round robin.

The above-described buffered distributor also includes a flow control mechanism according to IEEE 802.3x, where the repeater core will generate a pause frame when a predefined threshold is reached in the one of the receive FIFO buffers. Specifically, a network port having a detected congestion condition (i.e., stored data exceeding the predefined threshold) in its corresponding receive FIFO buffer will output a MAC control frame carrying a predetermined Pause interval into the corresponding transmit FIFO buffer. The network node in communication with that network port, having received the MAC control frame, will suspend transmission for the predetermined Pause interval, enabling the repeater core to remove packet data from the congested receive FIFO buffer.

A problem encountered in designing the buffered distributor involves the sizing of the receive FIFO buffers. Specifically, the sizing of the receive FIFO buffers is based upon the ability of the repeater core to efficiently generate flow control messages to the end network stations. Specifically, the use of a large receive FIFO buffer eliminates the necessity of precise flow control between the buffered distributor and the end network stations, while increasing the overall cost of the buffered distributor. Conversely, maintaining relatively small receive FIFO buffer sizes reduces the cost of the buffered distributor, while requiring precise flow control between the buffered distributor and the end network stations. If precise flow control is not maintained in a buffered distributor having relatively small receive buffer sizes, then congestion in the buffered distributor may cause the loss of received data packets. In addition, transmission of flow control frames having excessively tong pause intervals will adversely affect the network throughput by unnecessarily creating idle time after the receive FIFO buffer of the buffered distributor has been cleared.

DISCLOSURE OF THE INVENTION

There is a need for an arrangement that efficiently controls the transmission rate of network nodes in communication with a buffered distributor by generating flow control frames having pause intervals that precisely define the amount of time necessary for a buffer in the buffered distributor to be cleared to receive more data.

There is also a need for an arrangement in a buffered distributor that allows a system designer to implement relatively small receive buffers while maintaining high network throughput by generating precise flow control frames.

These and other needs are attained by the present invention, where a buffered distributor determines a pause frame interval specifying a necessary time interval for eliminating a congestion condition in an identified one of the receive buffers, the pause frame interval determined based on the relative packet length of data packets output by the buffered distributor before eliminating the congestion condition according to a prescribed output logic, the output data rate of the buffered distributor, and the associated overhead delay in the buffered distributor.

According to one aspect of the present invention, a method is performed in a buffered distributor having a plurality of network ports, each having a corresponding receive buffer configured for receiving data packets from a corresponding network node. The method includes determining data packet lengths for respective data packets stored in the receive buffers, detecting a level of stored packet data in a first of the receive buffers as exceeding the prescribed threshold corresponding to generation of a pause frame, and determining a pause frame interval for the pause frame based on a position of the stored packet data in the first receive buffer relative to a group of the stored data packets and the respective data packet lengths. The group of stored data packets are identified by the buffered distributor to be output from the associated receive buffers prior to the stored packet data in the first receive buffer according to a prescribed output logic. The prescribed output logic specifies the manner in which the stored data packets are output from the respective receive buffers and distributed to the remaining network ports, enabling the pause frame interval to be determined based on the data packet lengths associated with a group of the stored data packets. Hence, a pause frame interval can be precisely determined as the time necessary to eliminate congestion in a congested receive buffer based on an identified backlog of stored data packets, as well as the data transfer rate, and the overhead associated with mediating distribution of data packets among the contending network ports.

Another aspect of the present invention provides a buffered distributor having a plurality of network ports and a distribution core. The network ports each include a receive buffer, a transmit buffer, and a flow control generator configured for sending a flow control frame carrying a calculated pause interval to a corresponding network node. Each of the receive buffers has a prescribed flow control threshold for causing generation of the flow control frame by the corresponding flow control generator. The distribution core is configured for distributing at least one stored data packet from the receive buffer of the corresponding selected port to the transmit buffers of the remaining network ports according to a prescribed output logic. The distribution core also includes a pause interval calculator configured for calculating a pause interval based on a time interval for distributing a group of data packets prior to outputting from a congested receive buffer requiring flow control. Hence, the pause interval calculator provides precise generation of a pause interval specifying the time necessary to eliminate congestion in a specific receive buffer based on a time interval necessary for the distribution core to distribute a preceding group of data packets before outputting packet data from the identified receive buffer. The pause interval calculator also calculates the pause interval based on according to a prescribed output logic, enabling accurate generation in view of the distribution core protocol, for example, accommodating priority ports requiring guaranteed access latency.

Additional objects, advantages, and novel features of the invention will be set forth in part in the description which follows, and in part will become apparent to those skilled in the art upon examination of the following or may be learned by practice of the invention. The object and advantages of the invention may be realized and attained by means of the instrumentalities and combinations particularly pointed out in the appended claims.

BRIEF DESCRIPTION OF THE DRAWINGS

References made to the attached drawings, wherein elements having the same reference numeral designations represent like elements throughout and wherein:

FIGS. 3A, 3B, and 3C are diagrams illustrating alternate arrangements for the linked-list register of FIG. 1.

DETAILED DESCRIPTION OF ILLUSTRATED EMBODIMENTS

Figure 1:
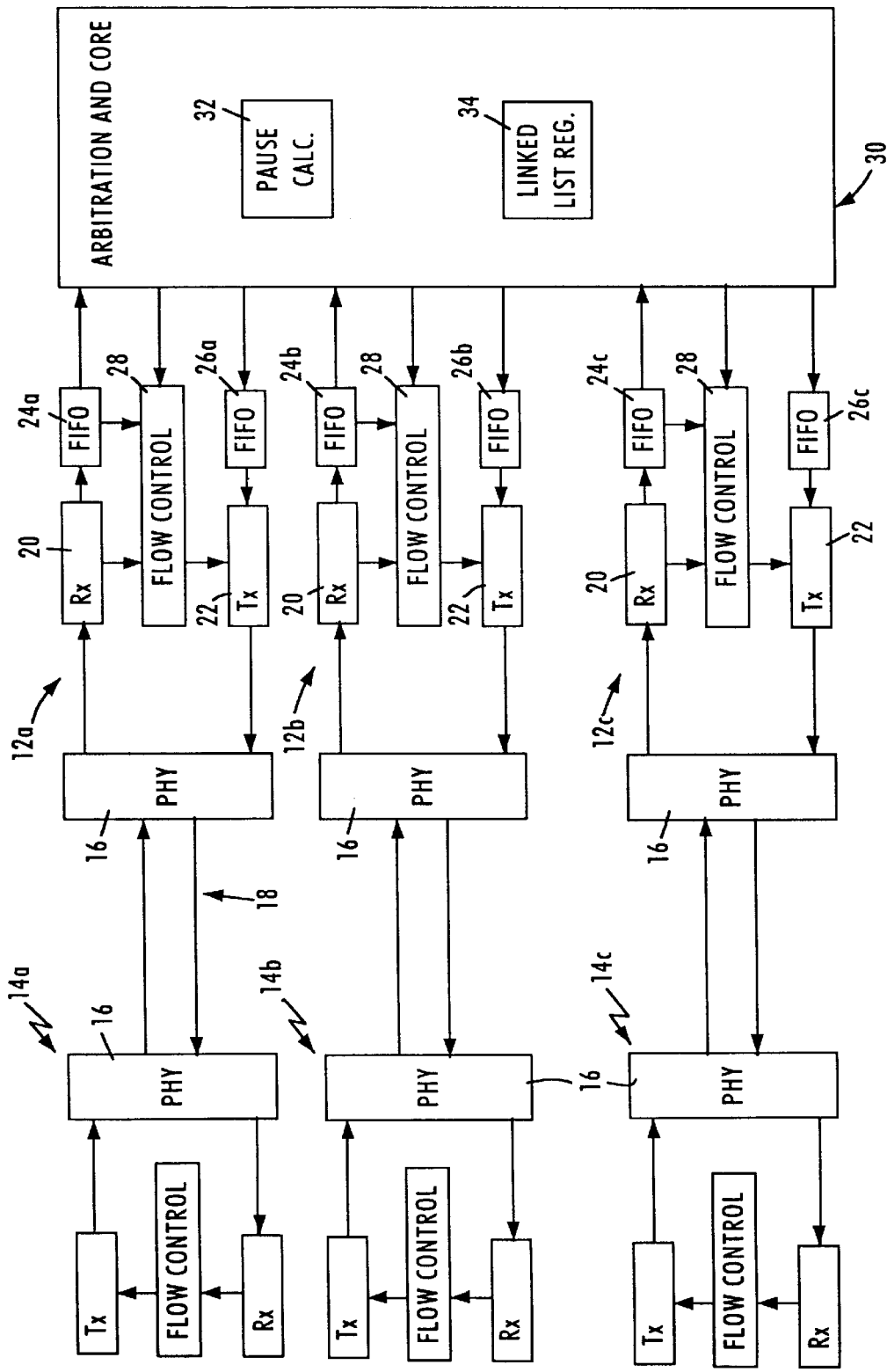
FIG. 1 is a block diagram of a buffered distributor serving network nodes according to an embodiment of the present invention.

FIG. 1 is a block diagram illustrating operation of a buffered distributor in a full-duplex packet switched network according to an embodiment of the present invention. The buffered distributor 10 includes a plurality of network ports 12, each configured for sending and receiving IEEE 802.3 data packets to and from respective network stations 14 according to IEEE 802.3x full-duplex protocol. As shown in FIG. 1, each of the network nodes 14 (e.g., data terminal equipment (DTE) or network station) and network ports 12 include a physical layer transceiver (PHY) 16 that sends and receives data symbols across a media 18 according to full-duplex protocol. The PHY transceiver 16 may be implemented as a discrete component, or may be integrated on-chip with the corresponding network node 14 or network port 12. The network nodes 14 and the buffered distributor 10 also include a media access control (MAC) layer receiver 20, a MAC layer transmitter 22, a receive FIFO buffer 24, and a transmit FIFO buffer 26. Each of the network nodes 14 and each of the network ports 12 also include a flow control generator 28 configured for generating a flow control frames according to IEEE 802.3x protocol.

The buffered distributor 10 also includes a distribution core 30 configured for distributing data packets from the receive FIFO buffers 24 from each network port 12 to the transmit FIFO buffers 26 of the remaining network ports according to a prescribed output logic, described below. The distribution core 30 is preferably configured to access the receive buffers 24 of each network port 12 according to a round robin sequence. Use of round robin sequence as the arbitration technique for the distribution core 30 provides a more efficient distribution of data packets from the receive buffers 24, resulting in minimal wasted bandwidth compared to CSMA/CD logic. As described below, use of the round robin sequence also enables the buffered distributor to accurately determine pause intervals for eliminating congestion in identified receive FIFO buffers 24.

The distribution core 30 includes a pause interval calculator 32 configured for calculating a pause interval for the flow controller generators 28, as described below. The pause interval calculator 32 calculates the pause interval based on the relative position of stored data packets, and the respective data packet lengths, relative to a currently-transmitting receive FIFO buffer 24 and a congested receive FIFO buffer. The pause interval calculator 32 uses the relative packet positions and the respective packet lengths to determine the time interval necessary to eliminate the congestion condition from the congested network port. The distribution core 30 also includes a linked list register 34 configured for storing the length of the received data packets. Specifically, the linked list register 34 enables the distribution core 30 to identify the stored data packets in each receive FIFO buffer 24, as well as the respective packet lengths. The distribution core 30 deletes the entry for a data packet from the linked list register 34 as the data packet is output by the distribution core 30 from the corresponding receive FIFO buffer 24 to the transmit FIFO buffers 26 of the remaining network ports.

Figure 2:
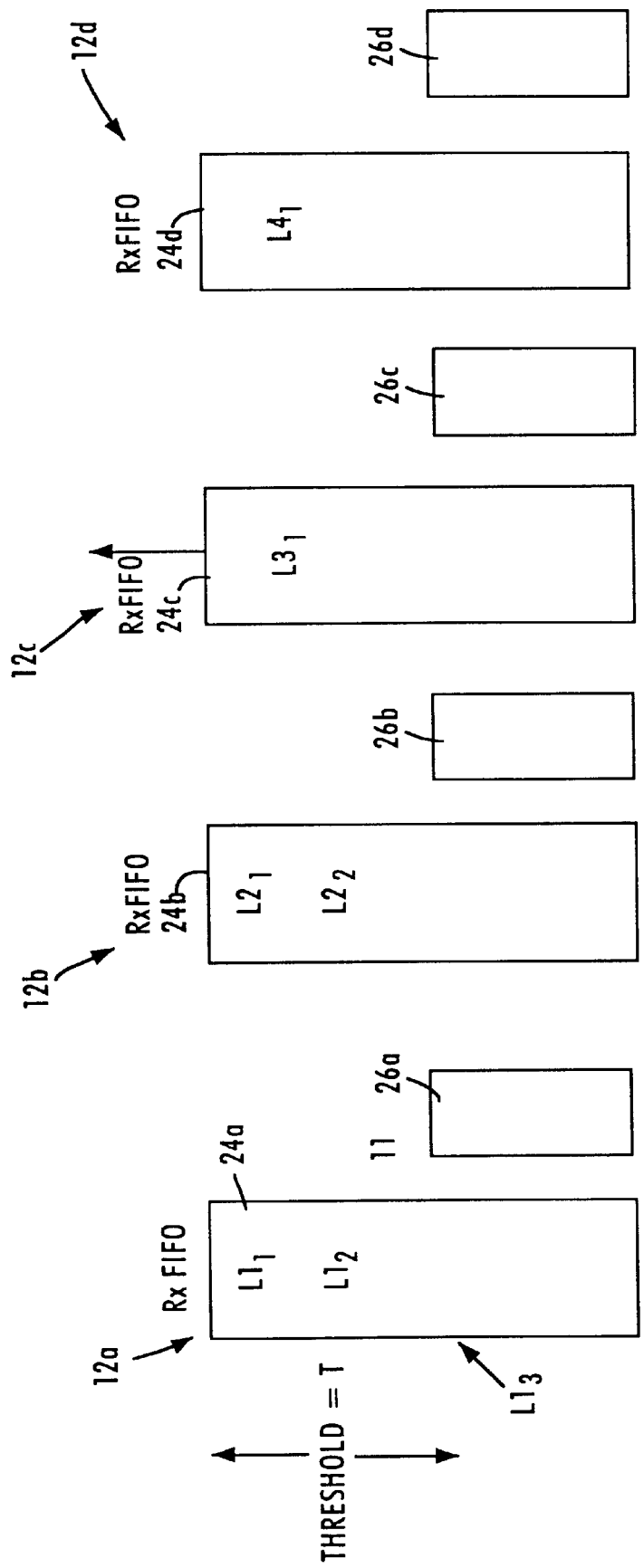
FIG. 2 is a diagram illustrating distribution of packet data by the repeater core of FIG. 1 according to a prescribed output logic.

FIG. 2 is a diagram illustrating the methodology for generating a pause interval. As shown in FIG. 2, a threshold (T) is set for each receive FIFO buffer 24 specifying a congestion condition, i.e., where a pause frame should be initiated. For example, the threshold (T) is set in each receive FIFO buffer 24 such that there is room for packets to be received by the receive FIFO buffer 24 from the remote network node 14 for a certain time period ($T_{rem}$). The time interval ($T_{rem}$) preferably has a maximum value of the time necessary to transmit two maximum length (1518 byte) packets, plus two IPG intervals (24 byte times), plus the time necessary to transmit a 64 byte pause frame ($t_1$), plus the buffered distributor processing time ($t_2$) for generating a pause frame with the appropriate time parameter:

$T_{rem}=2\times1518+24+(t_1)+(t_2)$ (byte times).

Hence, the threshold (T) is set such that there remains sufficient room in the receive FIFO buffer 20 to receive additional data packets transmitted during the time interval between detection of the congestion condition requiring a pause frame, outputting the pause frame from the buffered distributor 10 to the network node 14, and decoding of the transmitted pause frame by the network node 14.

According to the disclosed embodiment, each receive FIFO buffer 20 of the corresponding network port 12 monitors the length of the incoming data packet from the corresponding network node 14. Specifically, the MAC receiver 20, or alternately the receive FIFO buffer 24, includes a counter that counts the number of bytes in a received data packet. The length of the received data packet is then stored in the linked list register 34. As described below, the packet length is stored in the linked list register 34 based on the prescribed output logic used by the distribution core 30 to output data packets from the receive FIFO buffers 24 in a prescribed sequence. For example, FIGS. 3A and 3B are diagrams illustrating exemplary implementations of the linked list register 34, where the counted number of bytes are stored in the linked list register 34 based on the corresponding network port. Hence, the number of columns in the linked list register 34 of FIGS. 3A and 3B corresponds to the number of network ports 12.

Hence, the linked list register implementations of FIGS. 3A and 3B are arranged such that the first packet from the corresponding receive buffer 24 is stored in the top row of the corresponding column of the linked list register 34. For example, assume in FIG. 2 that the buffered distributor 10 includes four network ports 12, where the receive FIFO buffers 24a, 24b, 24c and 24d include packets having lengths $L1_i$, $L2_i$, $L3_i$, and $L4_i$, respectively, where i corresponds to the relative position of the data packet in the corresponding receive FIFO buffer 24. As shown in FIG. 2, the receive buffer 24a includes data packets having lengths $L1_1$, $L1_2$, and $L1_3$, and storage of the third data packet $L1_3$ causes the stored packet data to cross the predetermined threshold (T) specifying congestion of the corresponding receive FIFO buffer 24a. The receive FIFO buffer 24a outputs a signal to the corresponding flow control generator 28 in response to the detected congestion condition, causing the flow control generator 28 to begin generation of the pause frame. The pause calculator 32 also begins calculating a pause interval specifying the time interval necessary to eliminate the congestion condition from the receive FIFO buffer 24a of network port 12a, described below.

The pause calculator 32 may use different techniques for calculating the pause time interval, depending on the output logic used by the distribution core 30 to output data packets from the receive FIFO buffers 24. One arrangement is based upon the distribution core 30 using a round-robin output sequence, where the distribution core 30 distributes (i.e., outputs) a single data packet from the receive FIFO buffer 24 of a selected network port 12, and then selects another network port for distributing another single data packet from the corresponding receive FIFO buffer 24 to the transmit FIFO buffers 26 of the remaining ports. For example, assume the distribution core 30 is accessing network port 12c to output the data packet ($L3_1$) from the corresponding receive buffer 24c to the transmit buffers 26a, 26b, 26d of the remaining network ports 12a, 12b, and 12d. In this case, the pause calculator 32 calculates the pause time parameter for port 12a based on the relative position of the congested port 12a within the round-robin sequence starting with the currently outputting receive buffer (e.g., sequence 12c, 12d, 12a, 12b). In this case, the repeater core needs to output data packets $L3_1$, $L4_1$, and $L1_1$ according to the round-robin sequence "12c, 12d, 12a, 12b" before the level of the stored packet data in the receive buffer 24a falls below the threshold (T). Consequently, the pause calculator 32 calculates the pause interval based on the group of stored data packets to be output from the associated receive FIFO buffers 24 prior to eliminating the congestion in the receive FIFO buffer 24a according to the prescribed output logic sequence "$L3_1$, $L4_1$, $L1_1$".

In addition, the pause calculator 32 generates the pause interval based upon the data transfer rate of the distribution core 30, assuming that the distribution core data transfer rate (R) is different from the wire rate of the network media 18. Finally, the distribution core 30 may have an associated switching delay encountered each time the distribution core 30 switches from the receive FIFO buffer 24 of one network port 12 to another network port. Hence, the overall pause interval is calculated in FIG. 2 as:

$$P=(L3_1+L4_1+L1_1)/R+2T_{sd},$$

where $T_{sd}$ is the predetermined switching delay encountered each time the distribution core 30 switches to another network port 12.

This calculation of the pause interval (P) is the maximum time at which the first packet ($L1_1$) is removed from the receive FIFO 24a, enabling the receive FIFO 24a to receive another data packet at an arrival time which coincides with expiration of the pause timer at the remote network node 14a. At the same time the data packet ($L1_1$) is repeated to the remaining ports 12b, 12c, and 12d, the linked list register 34 is updated such that the register's first entry for the corresponding network port 12a includes the length of the first packet in the receive buffer 24 (e.g., $L1_2$). Thus, the pause interval (P) can be easily determined by identifying the relative position of the congested receive FIFO buffer 24a relative to the currently-transmitting receive FIFO buffer 24c in the round robin sequence, and obtaining the relative lengths of the data packets $L3_1$, $L4_1$, $L1_1$ from the linked list register 34 as shown in FIG. 3A.

An alternative arrangement for calculating the pause interval is used when a weighted round robin is used, where a network port requiring guaranteed access latency may have multiple data packets output from the corresponding receive buffer 24 at one time. For example, assume in FIG. 2 that the currently accessed received buffer 24c includes additional data packets having lengths $L3_2$ and $L3_3$, and that the repeater port 12c is a priority port. In this case, the pause calculator 32 would access the linked list register 34 as shown in FIG. 3B and calculate the pause interval as:

$$P=(L3_1+L3_2+L3_3+L4_1+L1_1)/R+2T_{sd}.$$

Alternatively, the pause frame calculation may maintain the round robin sequence using the linked list register of FIG. 3A, where the pause time frame has a time equivalent encompassing several iterations of a round robin sequence. In other words, the pause frame calculation is based on outputting data packets from the ports over two or more round robin sequences.

Another way of determining the group of data packets to be included in the generalized equation $P=\Sigma(L)/R+NT_{sd}$, is to keep an ordered list of all arrivals of data packets, as shown in the linked list register 34 of FIG. 3C, and calculate all the packets up to the last packet ($L1_3$) in the congested receive FIFO 24a. This arrangement will ensure that the entire receive FIFO 24a is empty before receiving another packet. This variation has the advantage that the number of pause frame generated by the distribution core 30 is reduced if the network is heavily noted.

Still another arrangement involves calculating a pause interval corresponding to a time interval needed to output a specified data packet in the congested receive buffer 24a before the stored packet data in the buffer falls a prescribed number of bytes (H) below the prescribed threshold (T). This arrangement provides a level of hysteresis in the pause frame calculation, ensuring that the amount of stored data in the data buffer 24a following expiration of the pause interval is not at or near the threshold level (T).

According to the disclosed embodiment, a buffered distributor (i.e., a full-duplex repeater) having receive buffers calculates pause frames on the basis of the size of the data packets that need to be output by the repeater core according to a round robin output sequence before congestion in an identified receive buffer is eliminated. The calculated pause frames, in conjunction with the prescribed congestion threshold, ensures that buffer sizes can be efficiently designed at a low cost, without compromising cost or the risk of lost data packets.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a buffered distributor having a plurality of network ports, each having a corresponding receive buffer configured for receiving data packets from a corresponding network node, a method comprising:

determining data packet lengths for respective data packets stored in the receive buffers;

detecting a level of stored packet data in a first of the receive buffers as exceeding a prescribed threshold corresponding to generation of a pause frame; and determining a pause frame interval for the pause frame based on a position of the stored packet data in the first receive buffer relative to a group of the stored data packets and the respective data packet lengths, the group of stored data packets identified by the buffered distributor to be output from the associated receive buffers prior to the stored packet data in the first receive buffer according to a prescribed output logic.

2. The method of claim 1, wherein the pause frame interval determining step comprises:

identifying a backlog sequence of network output ports starting with a currently-outputting receive buffer and ending with the first receive buffer;

identifying for each of the network ports in the backlog sequence an available stored data packet from the corresponding receive buffer; and determining a total size of the group of stored data packets based on the determined data packet lengths for the available stored data packets from the backlog sequence of output ports, respectively.

3. The method of claim 2, wherein the backlog sequence identifying step comprises specifying the backlog sequence according to a repeating prescribed network port output sequence.

4. The method of claim 3, wherein the repeating prescribed network port output sequence is a round robin sequence.

5. The method of claim 2, wherein the pause frame interval determining step further comprises determining a packet transfer interval based on said total size relative to a transfer data rate of the data packets from the respective receive buffers to output buffers for the respective network ports.

6. The method of claim 5, wherein the pause frame interval determining step further comprises determining a switching delay as a multiple number of prescribed switching delays relative to the backlog sequence of output ports.

7. The method of claim 1, wherein the data packet lengths determining step comprises:

counting a number of bytes for each of said data packets during reception thereof; and storing the counted number of bytes for each of the stored data packets as the determined data packet lengths in a linked-list register.

8. The method of claim 7, wherein the storing step comprises storing each counted number of bytes in the linked-list register based on the corresponding network port having received the corresponding data packet.

9. The method of claim 8, wherein the pause frame interval determining step comprises:

identifying a backlog sequence of network output ports starting with a currently-outputting receive buffer and ending with the first receive buffer; and selecting the group of stored data packets by selecting from the linked-list register one stored data packet for each network output port identified in the backlog sequence.

10. The method of claim 8, wherein the pause frame interval determining step comprises:

identifying a backlog sequence of network output ports starting with a currently-outputting receive buffer and ending with the first receive buffer;

identifying at least one of the network output ports within the backlog sequence as a priority port; and selecting the group of stored data packets by selecting from the linked-list register at least one stored data packet for each network output port identified in the backlog sequence, the selecting step comprising selecting a plurality of the stored data packets from the linked-list register corresponding to the identified priority port.

11. The method of claim 7, wherein the storing step comprises storing each counted number of bytes in the linked-list register based on an order in which the corresponding data packet was received by the buffered distributor.

12. The method of claim 11, wherein the pause frame interval determining step comprises selecting the group of stored data packets based on the order of the data packets in the linked-list register.

13. The method of claim 1, wherein the pause frame interval determining step comprises:

determining a time interval necessary to output a specified data packet in the first receive buffer before stored packet data in the first receive buffer falls a prescribed number of bytes below the prescribed threshold; and setting the pause frame interval based on said time interval.

14. The method of claim 13, wherein the time interval determining step comprises:

determining a sequence of data packets from said group of stored data packets to be output from the respective receive buffers according to a prescribed round robin sequence; and determining said time interval based on the determined sequence of data packets, the respective data packet lengths relative to a transfer data rate in the buffered distributor, and a switching delay encountered between each receive buffer.

15. A buffered distributor comprising:

a plurality of network ports, each comprising a receive buffer, a transmit buffer, and a flow control generator configured for sending a flow control frame carrying a calculated pause interval to a corresponding network node, each of the receive buffers having a prescribed flow control threshold for causing generation of the flow control frame by the corresponding flow control generator; and a distribution core configured for distributing at least one stored data packet from the receive buffer of a corresponding selected network port to the transmit buffers of the respective remaining network ports, the distribution core selecting each of the network ports according to a prescribed output logic, the distribution core comprising a pause interval calculator configured for calculating a pause interval, for the flow control frame, based at least on a time interval for distributing a group of data packets prior to outputting from an identified one of the receive buffers causing generation of the flow control frame.

16. The buffered distributor of claim 15, wherein the distribution core further comprises a linked-list register configured for storing determined lengths of received data packets, the distribution core deleting the determined length of a corresponding received data packet in response to distribution thereof.

17. The buffered distributor of claim 16, wherein the linked-list register stores the determined lengths according to the network port having received the corresponding data packet.

18. The buffered distributor of claim 16, wherein the linked-list register stores the determined lengths according to an order in which the corresponding data packet was received by the buffered distributor.

19. The buffered distributor of claim 15, wherein the distribution core selects the group of data packets based on a prescribed network port processing sequence and an identified priority of one of the network ports.

20. A method in a buffered distributor, comprising:

detecting a congestion condition in a receive buffer of an identified one of a plurality of network ports;

determining a time interval necessary to eliminate the congestion condition from the one network port, comprising:

(1) determining a number of stored data packets to be output from the receive buffers prior to outputting at least one data packet from the one network port, (2) determining the respective data packet lengths of the number of stored data packets, and (3) correlating the respective data packet lengths and a data packet length of the at least one data packet to a prescribed data transfer rate in the buffered distributor to obtain said time interval; and outputting a flow control frame from the one network port to a corresponding network node carrying the determined time interval.

21. The method of claim 20, wherein the correlating step includes adding a switching delay for each successive network port access during the time interval.

22. The method of claim 20, further comprising setting a congestion threshold in each of the network ports, the congestion threshold having a value based on elimination of the congestion condition upon expiration of a paused condition, specified by the determined time interval, at the network node.

* * * * *